March 2, 1926.

C. H. VOGT 1,574,949

METHOD OF AND MACHINE FOR TRIMMING ANIMAL HEADS

Filed August 28, 1920 2 Sheets-Sheet 1

Inventor
Charles H. Vogt,
By Jas. C. Nobersmith
Attorney.

March 2, 1926.  C. H. VOGT  1,574,949
METHOD OF AND MACHINE FOR TRIMMING ANIMAL HEADS
Filed August 28, 1920   2 Sheets-Sheet 2
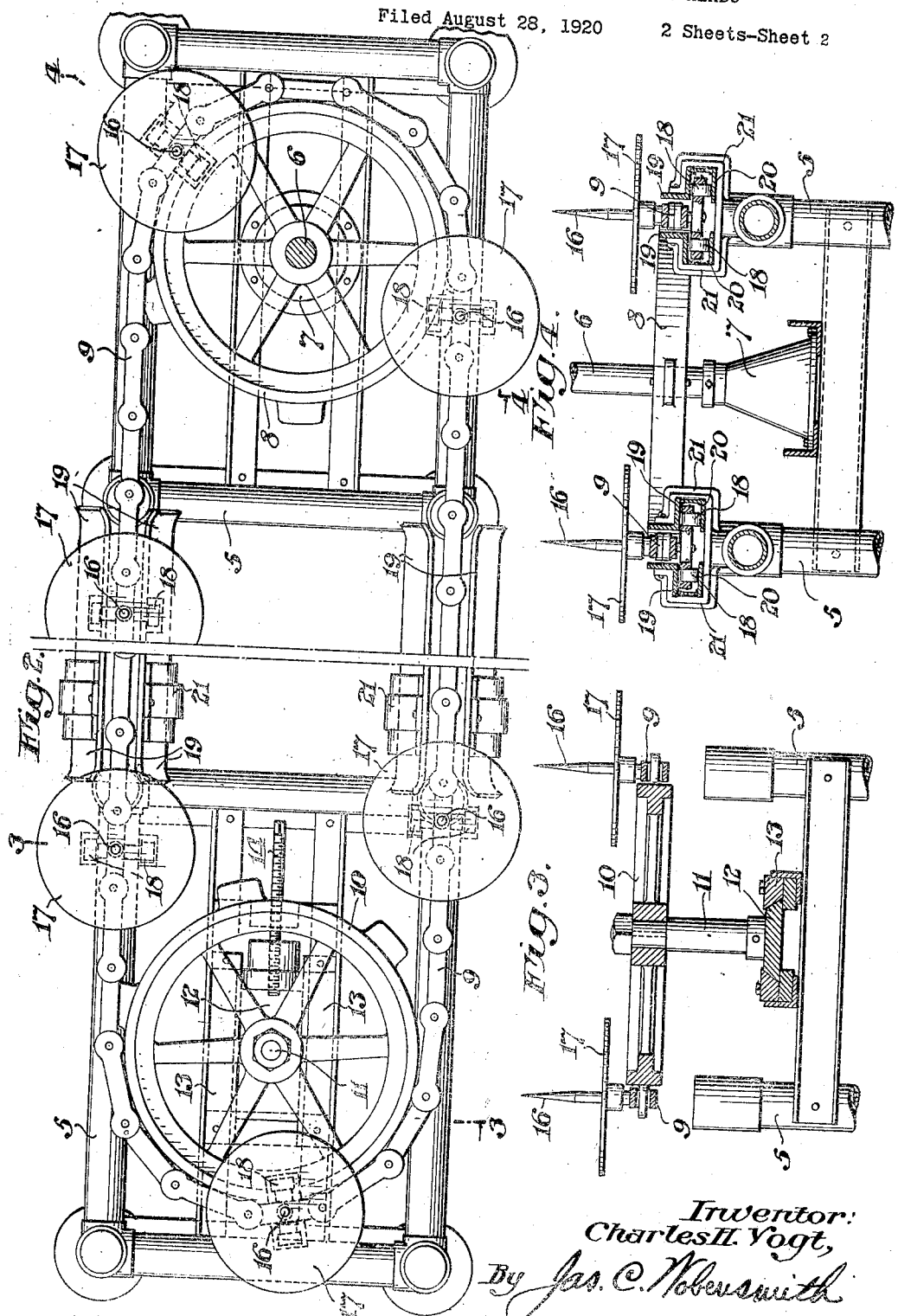
Inventor:
Charles H. Vogt,
By Jas. C. Nobensmith
Attorney.

Patented Mar. 2, 1926.

1,574,949

UNITED STATES PATENT OFFICE.

CHARLES H. VOGT, OF PHILADELPHIA, PENNSYLVANIA, ASSIGNOR OF ONE-THIRD TO FREDERICK A. VOGT, AND ONE-THIRD TO GUSTAV L. VOGT.

METHOD OF AND MACHINE FOR TRIMMING ANIMAL HEADS.

Application filed August 28, 1920. Serial No. 406,649.

*To all whom it may concern:*

Be it known that I, CHARLES H. VOGT, a citizen of the United States, residing at Philadelphia, in the county of Philadelphia and State of Pennsylvania, have invented certain new and useful Improvements in Methods of and Machines for Trimming Animal Heads, of which the following is a specification.

My invention relates to methods of and machines for trimming animal heads, that is to say, to a method of and machine or apparatus adaptable for use in slaughterhouses and the like, to assist in removing the fleshy parts from the heads of animals. Heretofore, in the operation of slaughterhouses and the like, one of the most difficult problems has been the economical handling of the head portion of the animal, this being a troublesome member to handle during the removal of the fleshy parts therefrom. The usual manner of carrying out this operation is to permit each individual operator to remove all of the fleshy parts of a particular head until the same are completely removed from the bone, this method being followed because of the difficulty of working otherwise.

The object of the present invention is to provide a novel method of trimming animal heads and a machine for carrying out said method upon which machine the animal heads are adapted to be conveniently supported and slowly moved past a group of operators, each located at a different station and each of whom will have a particular specialized portion of the entire operation to perform, thus resulting in greater efficiency in the operation.

The nature and characteristic features of my invention will be more readily understood from the following description, taken in connection with the accompanying drawings, forming part hereof, in which Figure 1 is a side elevation of a machine embodying the main principles of my present invention;

Fig. 2 is a top or plan view thereof;

Fig. 3 is a vertical section thereof taken approximately on the line 3—3 of Fig. 2; and Fig. 4 is a similar view, taken on the line 4—4 of Fig. 2.

Figure 1:
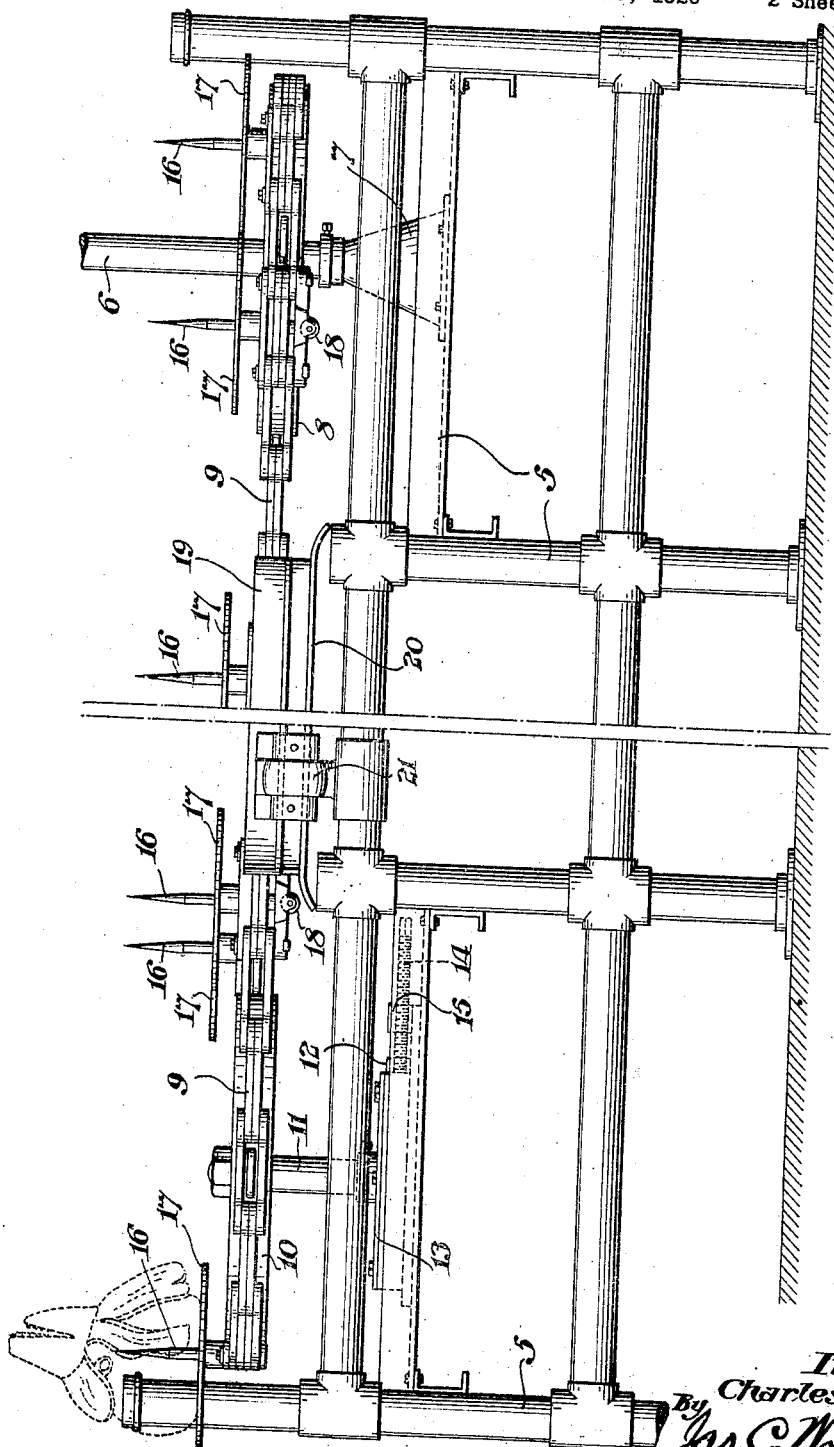

Referring to the drawings, in the particular embodiment of my invention therein shown, 5 is the frame of the machine, which may be constructed of piping and structural shapes, suitably united to each other to form the necessary support for the operative parts of the machine. The machine is actuated by a vertical driving shaft 6, which may have power imparted to it in any suitable manner. The lower end of the driving shaft 6 is supported in a suitable step bearing 7, which in turn is supported by a portion of the frame work 5 of the machine. Secured to the vertical shaft 6 is a sprocket wheel 8 which engages the links of a suitable chain 9 which is horizontally arranged.

At the other end of the machine, remote from the sprocket wheel 8, is an idler sprocket wheel 10, which is journalled on a stud shaft 11. The stud shaft 11 is supported by an adjusting block 12, which is mounted in a suitable frame work 13 in such manner as to be capable of longitudinal adjustment therein. For the purpose of effecting such adjustment, there is provided a screw 14 which is threaded in a lug 15, carried by the frame work 13. The purpose of the foregoing arrangement is to provide means for taking up the slack in the chain 9, which will occur on account of the constant wear of the pivots between the links thereof.

The chain 9 is provided at regular intervals with a plurality of upwardly extending spikes 16, upon which the animal heads are adapted to be impaled during the trimming operation. At the lower portion of each spike 16, adjacent the chain 9, is a table 17 which is adapted to limit the extent to which the animal head may be impaled on the spike 16, and thereby prevent the same from coming in contact with the chain 9, which would result in contamination of the edible portions of the animal head.

At each portion of the chain 9 where one of the spikes 16 is arranged, there is provided a pair of rollers 18, which are adapted to travel in a suitable trackway. The trackway may be formed by angle irons 19, which prevent upward movement of the rollers 18, and flat bars 20 which prevent downward movement of said rollers. The angle irons 19 also form guides to prevent sidewise displacement of the chain 9 (see Fig. 4). The angle irons 19 and the flat bars 20 are suitably supported from the framework 5 by means of brackets 21.

In the operation of the machine, and for the purpose of carrying out the method of my invention, the chain 9 is slowly driven at a constant speed, the chain 9 being of sufficient length to enable each animal head to be completely denuded of the fleshy parts by a sufficient number of operators who are disposed at various stations around the sides of the machine. The animal heads are successively impaled on the spikes 16 as the same pass a pre-determined point, and the same are then carried along, each of the operators performing his particular specialized portion of the trimming operation, so that when the head arrives at some other pre-determined point, the same will be in condition to be removed from the machine.

It will be noted that the impaling spikes are individually secured in a rigid manner, at spaced intervals, to certain links of the horizontally arranged chain, and that each individual impaling spike is provided with a separate table. By this arrangement, the successive operations of removing the various parts of the animal heads will be greatly facilitated, as the operators may, whenever they desire, readily rotate the animal heads upon the tables, the impaling spikes serving as an axis about which the same may be so rotated.

It will be noted that the arrangement is such that whenever it is necessary for the convenience of any particular operator, the head may be readily lifted from the spike 16 and re-impaled in a more advantageous position for working. It has been found in practice that the machine greatly facilitates the operation of removing the fleshy parts from the animal heads and results in greater efficiency and saving of labor in what has heretofore been a very troublesome operation.

Having thus described the nature and characteristic features of my invention, what I claim as new and desire to secure by Letters Patent, is:

1. A machine for trimming animal heads comprising a link chain arranged to be moved slowly and continuously in a horizontal plane, means for driving said chain, and a series of impaling spikes individually secured at spaced intervals to links of said chain, said spikes extending vertically upward from said chain and adapted to have animal heads rotatably impaled thereon.

2. A machine for trimming animal heads comprising a link chain arranged to be moved slowly and continuously in a horizontal plane, means for driving said chain, a series of impaling spikes individually secured at spaced intervals to links of said chain, said spikes extending vertically upward from said chain, and a large table arranged in conjunction with each of said impaling spikes adapted to limit the extent of impalement of the animal head thereon, and of a size to prevent the head from coming into contact with the chain and thereby preventing contamination of the edible portions of the head yet permitting the head to be manually rotated on said table about the axis of said spike.

3. A machine for trimming animal heads comprising a link chain arranged to be moved slowly and continuously in a horizontal plane, means for driving said chain, means for maintaining the horizontal position of said chain, a series of impaling spikes individually and rigidly secured at spaced intervals to links of said chain, said spikes extending vertically upward from said chain, and a table arranged in conjunction with each of said impaling spikes adapted to limit the extent of impalement of the animal head thereon, the tables being arranged to maintain the heads out of contact with the chain yet permitting said heads to be manually rotated on said tables about said spikes.

4. A machine for trimming animal heads comprising a link chain arranged to be moved slowly and continuously in a horizontal plane, means for driving said chain, a trackway adapted to maintain the horizontal position of said chain, a series of impaling spikes individually and rigidly secured at spaced intervals to links of said chain, said spikes extending vertically upward from said chain, and a relatively large table arranged in conjunction with each of said impaling spikes above the plane of the chain and the trackway and adapted to limit the extent of impalement of the animal head thereon, and to maintain the heads out of contact with the chain yet permitting said heads to be manually rotated on said tables about said spikes.

5. A machine for trimming animal heads comprising an endless link chain arranged to be moved slowly and continuously in a horizontal plane, means for driving said chain, means for taking up the slack of said chain, a trackway on each side of the chain intermediate the ends thereof and adapted to maintain the horizontal position of said chain, a series of impaling spikes individually and rigidly secured at spaced intervals to links of said chain, said spikes extending vertically upward from said chain, and a table arranged in conjunction with each of said impaling spikes above the planes of the chain and trackways and adapted to limit the extent of impalement of the animal head thereon and to maintain the heads out of contact with the chain and trackways yet permitting said heads to be manually rotated on said tables about said spikes.

6. A machine for trimmnig animal heads comprising a vertically arranged driving shaft, a sprocket mounted thereon, a horizontally disposed link chain driven by said sprocket, means for taking up the slack of said chain, a trackway adapted to maintain the horizontal position of said chain, a series of impaling spikes individually and rigidly secured at spaced intervals to links of said chain, said spikes extending vertically upward from said chain, and a large table arranged in conjunction with each of said impaling spikes adapted to limit the extent of impalement of the animal head thereon and maintain the head out of contact with the chain yet permitting said head to be manually rotated on said table about said spike.

7. A machine for trimming animal heads comprising a frame, a vertically arranged driving shaft extending downwardly and having its lower end supported in the frame, a sprocket mounted thereon adjacent its lower end, a horizontally disposed link chain driven by said sprocket, an idler sprocket over which said chain travels, means for taking up the slack of said chain, a trackway adapted to maintain the horizontal position of said chain, a series of impaling spikes individually and rigidly secured at spaced intervals to links of said chain, said spikes extending vertically upward from said chain, and a table arranged in conjunction with each of said impaling spikes adapted to limit the extent of impalement of the animal head thereon and to maintain the head out of contact with the chain yet permitting said head to be manually rotated on said table about said spike.

8. A machine for trimming animal heads comprising a frame, a vertically arranged driving shaft having its lower end journalled in the frame, a sprocket mounted thereon adjacent its lower end, a horizontally disposed link chain driven by said sprocket, an idler sprocket over which said chain travels, means for adjusting the location of said idler sprocket to take up the slack of said chain, a trackway adapted to maintain the horizontal position of said chain, a series of impaling spikes individually and rigidly secured at spaced intervals to links of said chain, said spikes extending vertically upward from said chain, and a table arranged in conjunction with each of said impaling spikes adapted to limit the extent of impalement of the animal head thereon and to maintain the head above the chain and trackway yet permitting said head to be manually rotated on said table about said spike.

9. The method of trimming meat from heads which consists in causing movement of the heads, while the heads are held from their inside, successively past trimming stations at which respectively similar meat trimming operations are performed, the meat trimming operations at different stations being different, so as to collect selective meat portions from the heads at various trimming stations.

10. The method of trimming heads which consists in holding the heads and moving the heads while so held from one trimming station to another for trimming operations at a number of such trimming stations at which different meat trimming operations upon the heads are performed, similar meat trimming operations being performed on the heads at the respective trimming stations.

11. In a head trimming apparatus, the combination of a traveling chain, operators' stations arranged along said chain, and pegs extending upwardly from said traveling chain and traveling therewith and arranged to have the heads of hogs placed thereabout, and arranged whereby said heads are shiftable about the axis of said respective pegs.

12. A head trimming apparatus comprising traveling head holders, a flexible endless conveyor, operators' stations arranged along said endless conveyor, and operative connecting means between said flexible endless conveyor and said head holders for conveying said head holders past said operators' stations and at which succeeding trimming operations are performed upon heads held by said head holders.

13. In a head trimming apparatus, the combination of a flexible conveyor, a head holder conveyed thereby comprising a base and a head holding peg, and guiding means for said base, said head holder provided with a shoulder to limit descent of the head upon said peg.

In testimony whereof, I have hereunto signed my name.

CHARLES H. VOGT.